J. I. HOLCOMB.
FEEDING DEVICE.
APPLICATION FILED MAY 18, 1914.

1,216,120.

Patented Feb. 13, 1917.
3 SHEETS—SHEET 1.

WITNESSES:
S. G. Greenwood
A H Edgerton

INVENTOR.
JAMES I. HOLCOMB.
BY
ATTORNEY.

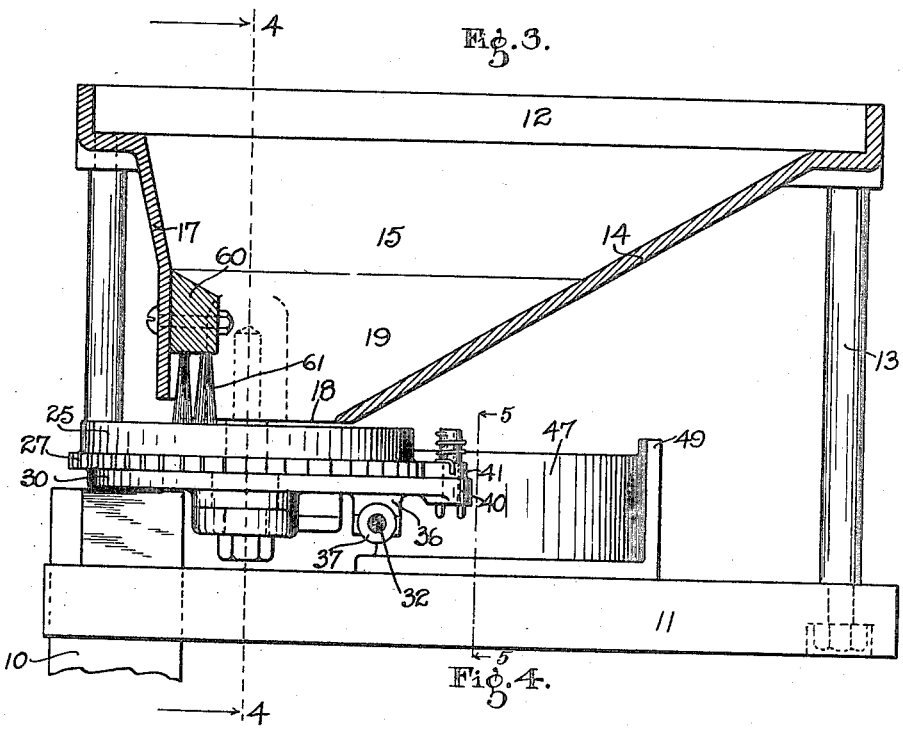

J. I. HOLCOMB.
FEEDING DEVICE.
APPLICATION FILED MAY 18, 1914.

1,216,120.

Patented Feb. 13, 1917.
3 SHEETS—SHEET 3.

INVENTOR
JAMES I HOLCOMB

BY
ATTORNEYS

UNITED STATES PATENT OFFICE.

JAMES I. HOLCOMB, OF INDIANAPOLIS, INDIANA.

FEEDING DEVICE.

1,216,120.  Specification of Letters Patent.  Patented Feb. 13, 1917.

Application filed May 18, 1914. Serial No. 839,298.

*To all whom it may concern:*

Be it known that I, JAMES I. HOLCOMB, a citizen of the United States, and a resident of Indianapolis, county of Marion, and State of Indiana, have invented a certain new and useful Feeding Device; and I do hereby declare that the following is a full, clear, and exact description thereof, reference being had to the accompanying drawings, in which like letters refer to like parts.

The object of this invention is to improve the mechanical feeding of corn popping machines and the invention has been made and used in connection with corn popping machines substantially similar to that set forth in the United States Letters Patent to Danial H. Talbert, No. 1,200,269, October 3, 1916. The satisfactory feeding of popcorn in corn popping machines of the automatic type has presented a difficult problem, and this invention has been made as a solution of such problem.

The full nature of the invention will be understood from the accompanying drawings and the following description and claims.

Figure 1:
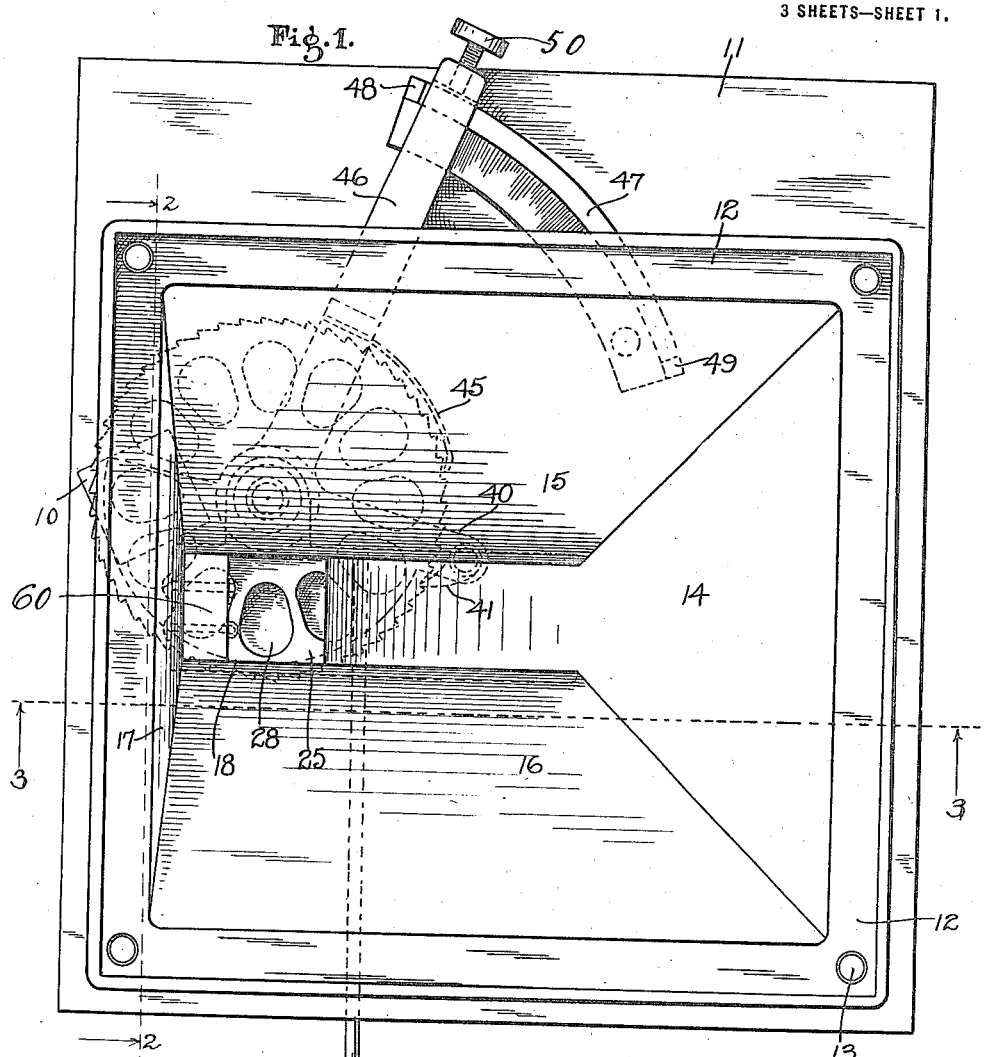
Figure 2:
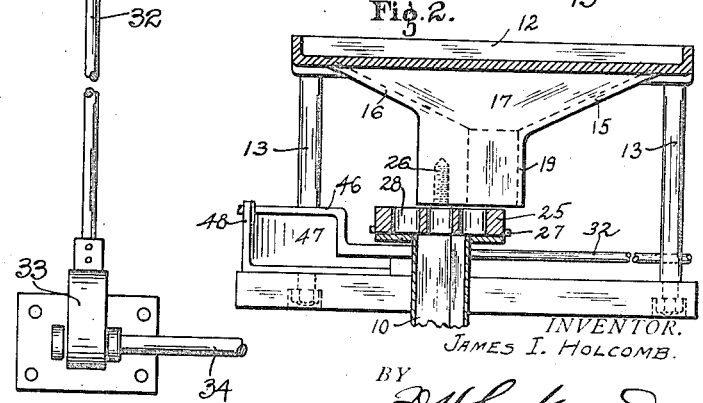
Figure 5:
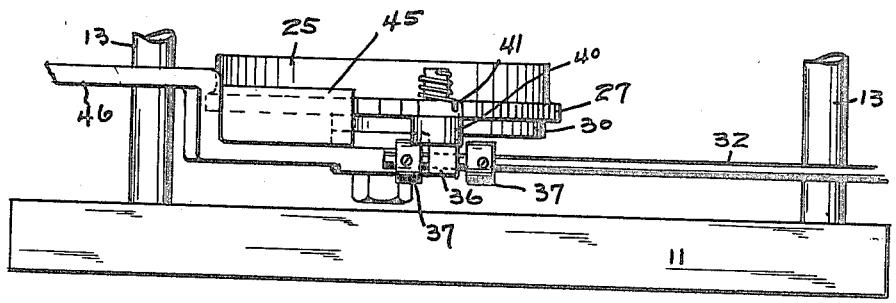
Figure 6:
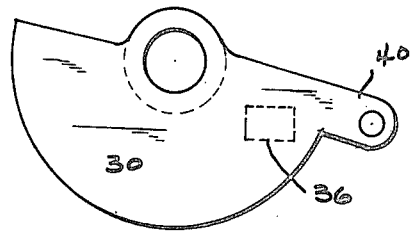

In the drawings, Figure 1 is a plan view of the machine with parts broken away and parts shown by dotted lines. Fig. 2 is a section on the line 2—2 of Fig. 1. Fig. 3 is a vertical section on the line 3—3 of Fig. 1. Fig. 4 is a vertical section on the line 4—4 of Fig. 3. Fig. 5 is a side elevation taken on the line 5—5 of Fig. 3. Fig. 6 is a plan view of a segmental plate.

This device is adapted to be placed upon the top of the corn popping machine which, however, is not here shown, but the chute 10 leads from this device downward for conveying the corn to the popping machine and this machine is for the satisfactory feeding of the corn to said chute 10.

There is a base 11 with a hopper 12 mounted thereon by means of the supports 13, one in each corner. The hopper 12 has sloping side and bottom portions 14, 15, 16 and 17. The central portion 14 of the hopper extends straight downward, but has an inclination to an outlet 18. The portion 15 of the hopper extends straight at the downward inclination until it reaches the vertical wall 19. The portion 16 is similar to the portion 15 excepting that it is provided with a vertical downward extension 20, as shown in Fig. 4. The upper part of the portion 17 is slightly inclined from a vertical line and the lower portion is substantially vertical. Therefore, between the vertical walls 19 and 20 and the lower part of the portions 14 and 17, there is a pocket marked 21 herein for convenience, terminating in its lower end in the outlet 18.

Under the hopper there is a horizontally disposed feed wheel 25 mounted on a vertical rod 26 which screws upward into the extension 20 from the hopper portion 16, as shown in Fig. 4. Said feed wheel has ratchet teeth 27 around it and a series of feed openings 28 through it, said feed openings moving successively beneath the outlet 18 from the hopper. These feed openings are egg-shaped, as shown in Fig. 1, with the tapering end projecting toward the center of the wheel 25 so that the sides of the openings 28 are substantially radial. The feed wheel rides and rotates loosely over a segmental plate 30 which is oscillatably mounted on the bolt 26 and always closes the bottom of the pockets 28 when they are registering either wholly or partially with the hopper outlet 18, serving to hold the popcorn in the pockets 28 until the feeding movement of the wheel 25 ultimately brings the pocket over the chute 10. Therefore, the segmental plate 30 must project partially over the chute 10, at least when said plate 30 is at one limit of its oscillatory movement. When it is at the other end of its oscillatory movement, the plate 30 will not extend over the chute 10 and will move from under the pocket in the wheel 25 which has been moved over the chute 10 and thus permit the discharge of the corn from the pocket to the chute.

The means for oscillating the segmental plate 30 and giving the wheel 25 its feeding movement consists of a reciprocatory rod 32 which is actuated by an eccentric 33 on a driving shaft 34 mounted in posts 35. The rod 32 projects loosely through a lug 36 which extends downward from the segmental plate 30, see Figs. 3 and 5, and there are collars 37 secured on said rod 32 on each side of the lug 36, but spaced far enough from said lug to allow for a little freedom of movement. Therefore, each revolution of the eccentric 33 causes a to and fro movement of the segmental plate 30.

An arm 40 extends radially from the segmental plate 30 and carries a spring pawl 41 adapted to engage the ratchet 27 on the wheel 25 and give said wheel step by step movement in the direction of the arm, shown in Fig. 1.

The rod 32 has in the particular construction shown a substantially uniform throw and, therefore, the movement of the wheel 25 at each stroke of the rod 32 is adjusted by means of a plate 45 which is mounted on a lever 46 and lies rather close to the ratchet 27 with its forward end beveled and projecting rather close to the arm 40 so that when the plate 45 is adjusted to a forward position, the pawl 41 will ride off the plate 45 and disengage the ratchet and when the pawl is given its forward movement, it will ride off the plate 45 and engage the ratchet and advance the wheel 25. In Fig. 1, a lever 46 is adjusted at one limit of its movement so that each movement of wheel 25 will equal the distance between the end of the plate 45 and the end of the pawl 41. By moving the lever 46 along a segmental bar 47, the plate 45 will be brought close to the end of the pawl 41, as shown in Fig. 1, and thus correspondingly reduce the extent of forward movement which said pawl at each stroke will give the wheel 25. The lever 46 is at its inner end pivoted on the bolt 26 and at its outer end travels over the segmental bar 47 between the stops 48 and 49 thereon. A set screw 50 in the outer end of said lever 46 engages the outer surface of the segmental bar 47 so as to hold the lever 46 in an adjusted position.

This adjustment enables the feeding movement of the wheel 45 to be varied in speed for reducing the length of each movement and when the lever 46 is at its lowest limit of movement, the plate 45 will hold the pawl entirely out of engagement with the ratchet 27 and thus will stop the movement of the feed wheel 25. The segmental plate 30, however, will always have a uniform movement.

The combined step by step forward movement of the feed wheel with the associated oscillatory movement of the segmental plate causes them to coöperate in a peculiar way. When the feed wheel moves far enough over the plate to uncover only a portion of a pocket, some corn will remain in the pocket, but the return movement of the segmental plate will cause a discharge of said corn and in fact, such return movement of the plate may not only cause the discharge movement of a little of the corn in the pocket, but it may move away from under a portion of the succeeding pocket and allow a discharge of a portion of the corn in that pocket. The fact that the pawl and ratchet is mounted on a segmental plate whereby the feed wheel is actuated, causes a close coaction of said two parts of the machine.

The back movement of the wheel 25 is prevented by any common means for that purpose, but in the form shown the end of the plate is thin and projects inward and since said plate is in the nature of a spring, it serves as a pawl and accomplishes that function in addition to the function above mentioned. On the portion 17 of the hopper there is a brush block 60 secured with downwardly extending brushes 61 which project to the left-hand side of the hopper outlet 18, as shown in Figs. 1 and 3, so as to prevent any of the corn from passing out under the plate 17 and cause it all to enter the pockets 28 of the wheel 25.

The invention is:

1. A feeding device including a hopper with a reduced outlet, a rotatable wheel mounted horizontally below said hopper with pocket holes therethrough arranged to register with the outlet from the hopper, an oscillatory plate beneath said wheel, and means for adjusting said oscillating plate and holding it in adjusted position.

2. A feeding device including a hopper with a reduced outlet, a rotatable wheel mounted horizontally below said hopper with pocket holes therethrough arranged to register with the outlet from the hopper, an oscillatory plate beneath said wheel, and means for causing a step by step advance movement of said wheel and an oscillatory movement of said plate.

3. A feeding device including a hopper with a reduced outlet, a rotatable wheel mounted horizontally below said hopper with pocket holes therethrough arranged to register with the outlet from the hopper, an oscillatory plate beneath said wheel, means for giving said plate an oscillatory movement, and means carried by said plate for giving the wheel a step by step forward movement.

4. A feeding device including a hopper with a reduced outlet, a rotatable wheel mounted horizontally below said hopper with pocket holes therethrough arranged to register with the outlet from the hopper, the periphery of said wheel being provided with ratchet teeth, a plate beneath said wheel, means for oscillating said plate, an arm extending radially from said plate beyond said wheel, and a spring pawl on said arm for engaging the ratchet teeth on said wheel for causing a step by step movement of the wheel.

5. A feeding device including a hopper with a reduced outlet, a rotatable wheel mounted horizontally below said hopper with pocket holes therethrough arranged to register with the outlet from the hopper, an oscillatory plate beneath said wheel, means for giving said plate an oscillatory movement, means carried by said plate for giving the wheel a step by step forward movement, and means for varying the extent of each actuation of said wheel.

6. A feeding device including a hopper with a reduced outlet, a rotatable wheel mounted horizontally below said hopper with pocket holes therethrough arranged to register with the outlet from the hopper, the periphery of said wheel being provided with ratchet teeth, a plate beneath said wheel, means for oscillating said plate, an arm extending radially from said plate beyond said wheel, a spring pawl on said arm for engaging the ratchet teeth on said wheel and causing a step by step movement of the wheel, a lever pivoted concentric with said wheel, and a plate carried by said lever arranged to lie close to the ratchet so that said plate may hold the pawl out of engagement with the ratchet on said wheel during a part of the movement of the pawl.

7. A feeding device including a hopper with a reduced outlet, a rotatable wheel mounted horizontally below said hopper with pocket holes therethrough arranged to register with the outlet from the hopper, the periphery of said wheel being provided with ratchet teeth, a plate beneath said wheel, means for oscillating said plate, an arm extending radially from said plate beyond said wheel, a spring pawl on said arm for engaging the ratchet teeth on said wheel and causing a step by step movement of the wheel, an adjustable lever pivoted concentric with said wheel, and a plate carried by said lever arranged to lie close to the ratchet so that said plate may hold the pawl out of engagement with the ratchet on said wheel during a part of or the entire movement of the pawl, as desired.

8. A feeding device including a hopper with a reduced outlet, a rotatable wheel mounted horizontally below said hopper with pocket holes therethrough arranged to register with the outlet from the hopper, the periphery of said wheel being provided with ratchet teeth, a plate beneath said wheel, means for oscillating said plate, an arm extending radially from said plate beyond said wheel, a spring pawl on said arm for engaging the ratchet teeth on said wheel and causing a step by step movement of the wheel, an adjustable lever pivoted concentric with said wheel, a plate carried by said lever arranged to lie close to the ratchet so that said plate may hold the pawl out of engagement with the ratchet on said wheel during a part of the movement of the pawl, and means for securing said lever in its adjusted position.

In witness whereof, I have hereunto affixed my signature in the presence of the witness herein named.

JAMES I. HOLCOMB.

Witness:
J. H. WELLS.